April 29, 1969     J. F. SARVER ET AL     3,441,421
CALCIA-MAGNESIA-ALUMINA SEAL COMPOSITIONS
Filed Oct. 24, 1966     Sheet 1 of 2

Inventors:
James F. Sarver
William C. Louden
by Ernest W. Legree
Their Attorney

United States Patent Office 3,441,421
Patented Apr. 29, 1969

3,441,421
CALCIA-MAGNESIA-ALUMINA SEAL
COMPOSITIONS
James F. Sarver, Highland Heights, and William C. Louden, South Euclid, Ohio, assignors to General Electric Company, a corporation of New York
Filed Oct. 24, 1966, Ser. No. 588,955
Int. Cl. C04b 35/10; H01j 61/30
U.S. Cl. 106—39         2 Claims This invention relates to sealing compositions of particular value in bonding to alumina ceramic, that is, in bonding ceramic to ceramic or ceramic and metal together.

Alumina ceramic is particularly suitable as an envelope material for high intensity alkali metal vapor lamps such as high pressure sodium vapor lamps, because it withstands the attack of the vapors of the alkali metals even at high temperatures. In order to have a lamp, it is necessary to provide electrodes and inleads and this entails bonding metal end caps or closures to an alumina ceramic tube. The metal having a coefficient of expansion closest to that of alumina ceramic is niobium and a good bond between alumina ceramic and this metal is particularly desired. Compositions which have been used for this purpose consist of aluminum oxide and calcium oxide as principal ingredients plus a minor proportion of magnesium oxide, the constituent oxide being in eutectic or near eutectic proportions as described and claimed in copending application Ser. No. 158,797, filed Dec. 12, 1961, now Patent No. 3,281,309 of John F. Ross, entitled, "Ceramic Bonding." Calcia-magnesia-alumina compositions have been chosen for sealing alumina ceramic to niobium because of their favorable liquidus temperatures, stability in the presence of alkali metal vapors at elevated temperatures, and ability to form glasses when melted and cooled rapidly. One sealing composition which has been used in the commercial production of high pressure sodium lamps in alumina ceramic envelopes has been designated the A-seal composition; it consists of 38.5% CaO, 7.5% MgO, and 54.0% $Al_2O_3$ and is more fully described and claimed in copending application Ser. No. 388,567 of Paul J. Jorgensen, filed Aug. 10, 1964, and entitled, "Ceramic Bonding," now abandoned in favor of similarly entitled continuation-in-part application Ser. No. 590,848, filed Oct. 31, 1966.

Our invention is predicated on the concept of using calcia-magnesia-alumina sealing compositions which are low in alumina with respect to minimum liquidus temperature. During the sealing operation, the composition dissolves alumina from the alumina ceramic with an accompanying initial decrease in the liquidus temperature at the seal area. As the solution of alumina by the molten seal continues, the liquidus temperature passes through a minimum and increases again until the seal begins to solidify with the formation of magnesium aluminate and/or other crystalline phases. In this fashion, the sealing composition remains molten and mobile for a relatively long time during which more complete release of gases from the seal area takes place and the manufacturing losses attributable to premature end cap positioning due to initial rapid formation of crystalline phases is reduced.

Calcia-magnesia-alumina sealing compositions meeting the requirements of the invention comprise not more than 52% and not less than 46% $Al_2O_3$, are located within the primary field of crystallization of magnesia, have a ratio of calcia to magnesia of approximately 5.13 to 1, and have liquidus temperatures below 1600° C.

The features of the invention believed to be novel are set forth in the claims appended hereto. The invention, however, will be better understood from a consideration of the following detailed description and the accompanying drawings wherein:

FIG. 4 is an isoplethal section of the

system at a CaO to MgO ratio of 5.13 to 1.

Figure 1:
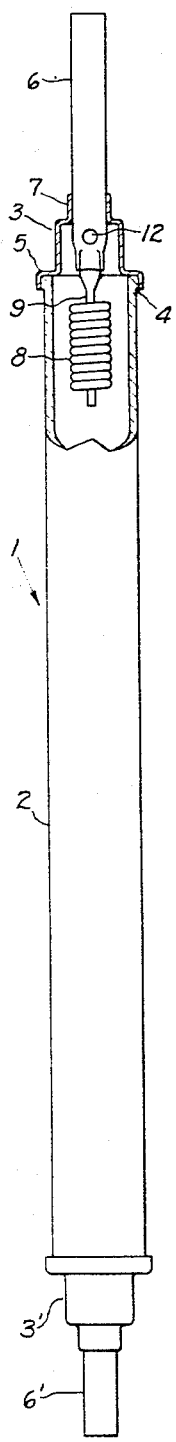
FIG. 1 shows a typical alumina ceramic lamp in which the sealing composition of the invention is used.

A typical lamp application of the sealing composition of the invention is illustrated in FIG. 1 wherein an arc tube 1 comprises an envelope 2 of ceramic tubing consisting of sintered high density polycrystalline alumina. The ends of the tube are closed by thimble-like niobium closures or end caps 3, 3' hermetically sealed to the ceramic by means of the sealing composition of the invention. At the sectioned upper end of the tube, the sealing composition, is indicated at 4 in the space between the expanded shoulder portion 5 of the end cap and the side and end of the ceramic tube. A niobium tube 6 penetrates into the thimble and is used as an exhaust tube during manufacture after which it is closed off. A thermionic electrode 8 is mounted in each end of the arc tube whose filling may consist of a sodium-mercury amalgam dose and an inert gas such as xenon.

Figure 2:
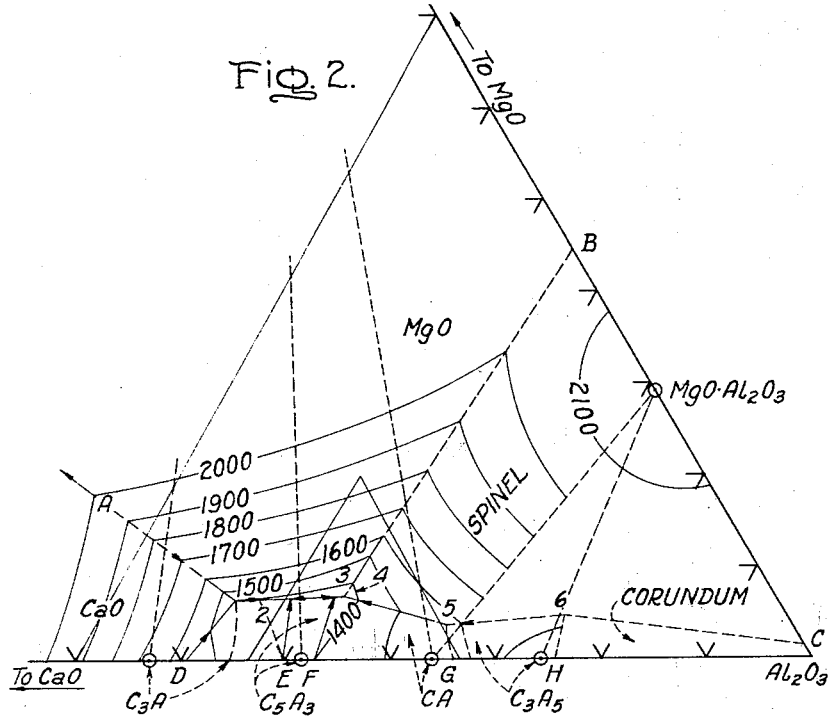
FIG. 2 is a phase diagram of the calcia-magnesia-alumina system.

FIG. 2 shows the phase diagram for the system

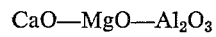

as determined by G. A. Rankin and H. E. Merwin, Journal of the American Chemical Society, 38, 568 (1916), and which appeared as shown in Phase Diagrams for Ceramists. The portion of interest is the area within the small triangle and it is shown to a larger scale in FIG. 3.

Figure 3:
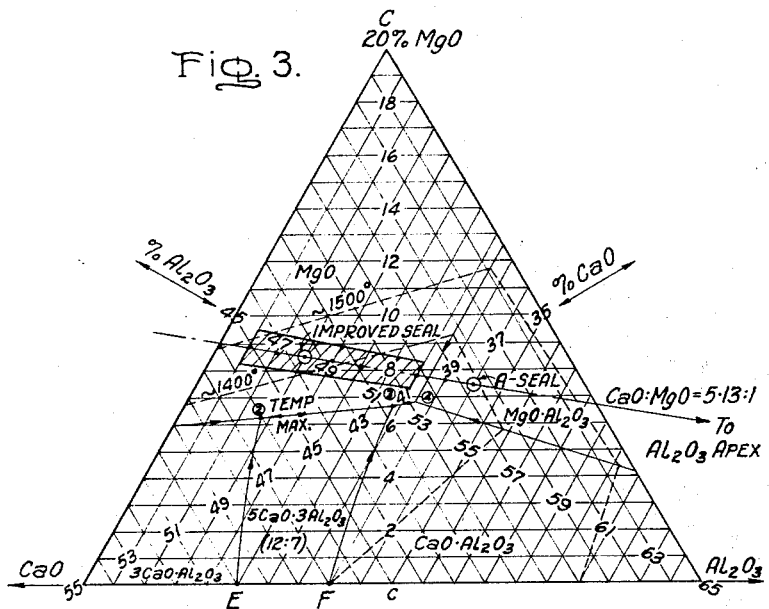
FIG. 3 is an expanded view of the portion of the phase diagram enclosed within the small triangle in FIG. 2.
Figure 4:
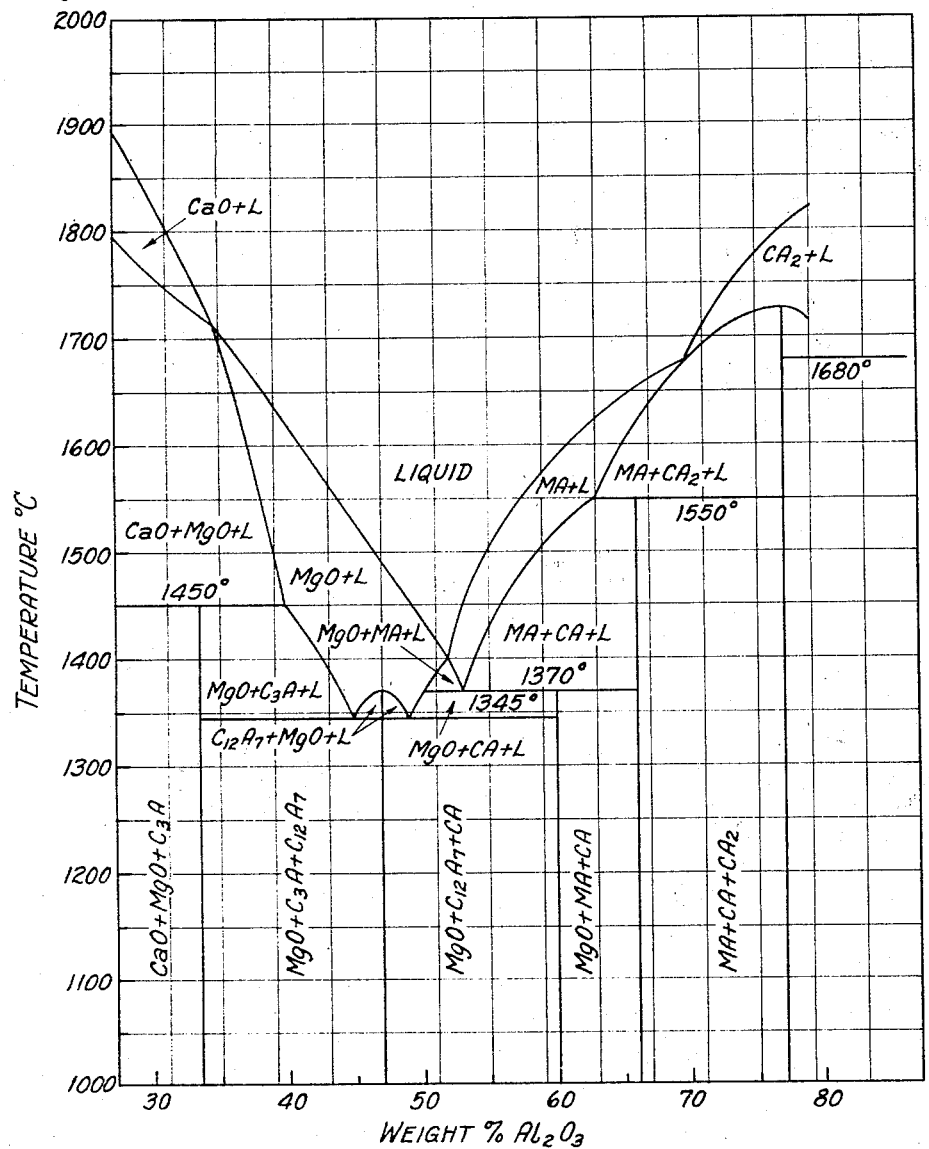

FIG. 4 is an isoplethal section depicting the phase equilibrium relationships in the $CaO—MgO—Al_2O_3$ system at a particular CaO:MgO ratio and was constructed from the diagram and data given in FIGS. 2 and 3. It corresponds to the dot-dash line representing a CaO to MgO ratio of 5.13 to 1 in FIG. 3. This section is one of an infinite number of isoplethal sections which can be constructed passing through the $Al_2O_3$ apex; this particular section also passes through the A-seal composition mentioned previously. It shows what phases are in equilibrium at any particular temperature and $Al_2O_3$ concentration for compositions in which the CaO:MgO ratio is 38.5:7.5, that is 5.13:1.

Consideration of FIG. 4 facilitates understanding the phenomena which can occur under equilibrium conditions during the sealing operation when using for example the A-seal composition at a temperature of about 1550° C. At the initial $Al_2O_3$ concentration of 54.0%, liquid phase first occurs at about 1345° C. and the sealing composition becomes entirely liquid at about 1480° C. At 1550° C., the liquid proceeds to dissolve $Al_2O_3$ out of the alumina ceramic, and as the composition becomes enriched with $Al_2O_3$, magnesium aluminate or spinel crystals will form when the $Al_2O_3$ concentration exceeds about 57 to 58%. Additional spinel, $MgO.Al_2O_3$, will form as more $Al_2O_3$ is dissolved until, at a concentration of about 63%, calcium aluminate, $CaO.Al_2O_3$, crystals will also appear. If the reaction proceeds far enough, and if transport of dissolved $Al_2O_3$ is sufficiently rapid to maintain a homogeneous condition in the seal area, the entire seal area will solidify at 1550° C. with the appearance of a third crystalline phase, $CaO_2.Al_2O_3$. The effect of dissolving additional $Al_2O_3$ into the sealing composition has thus been to raise not only the liquidus temperature very markedly but also to raise the solidfication temperature of the seal area from 1345° C. (point 3 in FIG. 2) to 1550° C. (point 5). The foregoing assumes the idealized situation of a heterogeneous equilibrium condition in the seal area.

This is improbable under a typical practical sealing schedule requiring for instance about 5 minutes at 1550° C. It is more likely that a gradient in the $Al_2O_3$ concentration occurs, and that crystalline phases form first at the interface between liquid and alumina ceramic. With the A-seal composition, uneven end cap positioning has often been observed and this is attributed to extensive formation of crystalline material during the early stages of sealing in areas in which the niobium metal is very close to the alumina ceramic.

By reference to FIG. 3, it is seen that if the $Al_2O_3$ concentration in the seal composition is lowered from 54% corresponding to the A-seal, the liquidus temperature will decrease until a minimum is reached at 52% $Al_2O_3$. Further reduction of the $Al_2O_3$ concentration below 52% will raise the liquidus temperature again. According to our invention, calcia-magnesia-alumina sealing compositions are provided in which the alumina concentrations are chosen below 52%. By so doing, the liquidus temperature will initially decrease as $Al_2O_3$ goes into solution, and then increase again beyond the minimum. This means that considerably more alumina must be dissolved in the composition in order for magnesium aluminate and/or calcium aluminate crystals to appear and the molten state is thereby prolonged. This results in more complete release of gases from the seal area, better adhesion of the sealing composition to the alumina ceramic and at the same time diminishes the probability of premature end-cap setting with resultant manufacturing losses.

The validity of the foregoing reasoning was established and at the same time the reliability of Rankin and Merwin's diagram shown in FIG. 2 was confirmed by preparing several compositions at 1% $Al_2O_3$ concentration intervals, from 46% to 54% along the isoplethal section having a CaO:MgO ratio of 5.13 to 1 (FIGURE 3). The results are shown in the following table below.

TABLE

[Modified A-seal compositions, constant CaO:MgO ratio (5.13:1)]

| Weight percent | | | Liquidus temperature, °C. | |
|---|---|---|---|---|
| CaO | MgO | $Al_2O_3$ | Observed | Estimated |
| 38.500 | 7.500 | 54.0 | 1,483 | 1,475 |
| 39.336 | 7.664 | 53.0 | 1,468 | 1,450 |
| 40.173 | 7.827 | 52.0 | 1,400 | 1,405 |
| 41.010 | 7.990 | 51.0 | 1,429 | 1,420 |
| 41.847 | 8.153 | 50.0 | 1,444 | 1,435 |
| 42.684 | 8.316 | 49.0 | 1,455 | 1,455 |
| 43.521 | 8.479 | 48.0 | 1,487 | 1,475 |
| 44.358 | 8.642 | 47.0 | 1,492 | 1,490 |
| 45.195 | 8.805 | 46.0 | 1,513 | 1,510 |

The liquidus temperatures estimated from the Rankin and Merwin diagram are given under the heading "Estimated," while the values determined experimentally are given under the heading "Observed." A minimum in the liquidus temperature was observed betwen 51% and 53% $Al_2O_3$ and occuring at about 1400° C., in good agreement with Rankin and Merwin's work. The observed liquidus temperature for an alumina concentration of 48.0% is about the same as that for a 54% concentration so that both initially melt at about the same temperature, namely 1483 to 1487° C. However, the 48% composition remains liquid much longer during sealing and consistently produces superior seals. In an extensive series of tests, manufacturing loss or shrinkage due to imperfectly aligned niobium end caps was zero with the 48% composition. Photomicrographs of sectioned ends of the alumina envelope show that the edges are more rounded, thus confirming that the molten seal dissolves more alumina prior to the appearance of crystalline phases when using a sealing composition on the low alumina side of the liquidus minimum.

The compositions which we have found suitable for sealing to alumina ceramic and superior to the A-seal composition are those listed in Table I wherein the alumina concentration is from 52% to 46%. These are within the primary field of MgO, meaning that MgO always appears as the first crystalline phase upon cooling from the liquid state, and have a ratio of calcia to magnesia of approximately 5.13 to 1. A departure of ±0.5% in the percentage of magnesia can be tolerated and does not affect the results appreciably. This results in a small range of compositions from 52% to 46% alumina and extending about 0.5% in magnesia concentration above and below the 5.13 to 1 calcia to magnesia isopleth line, such range corresponding to the crosshatched trapezoidal area in FIG. 3. Within this range, compositions from 50% to 48% alumina are preferred. It is undesirable to heat the alumina envelope and the niobium end caps above 1600° C., during the sealing operation, and the sealing compositions according to our invention all have liquidus temperatures below 1600° C.

What we claim as new and desire to secure by Letters Patent of the United States is:

1. A calcia-magnesia-alumina composition for sealing to alumina ceramic comprising not less than 46% and not more than 52% $Al_2O_3$ by weight and the balance CaO and MgO in a ratio one to the other of approximately 5.13 to 1, the actual percentage by weight of MgO within the composition being within 0.5% of the figure determined by the preceding relationship and said composition having a liquidus temperature below 1600° C.

2. A sealing composition as defined in claim 1 wherein the percentage by weight of $Al_2O_3$ is from 48 to 50%, and the ratio of CaO to MgO is approximately 5.13 to 1.

References Cited

UNITED STATES PATENTS

| 2,120,338 | 6/1938 | McDougal et al. | 106—46 X |
| 3,239,323 | 3/1966 | Folweiler | 106—65 X |
| 3,281,309 | 10/1966 | Ross | 106—65 X |

HELEN M. McCARTHY, *Primary Examiner.*

W. R. SATTERFIELD, *Assistant Examiner.*

U.S. Cl. X.R.

106—46, 65; 313—220